United States Patent Office 3,289,417
Patented Dec. 6, 1966

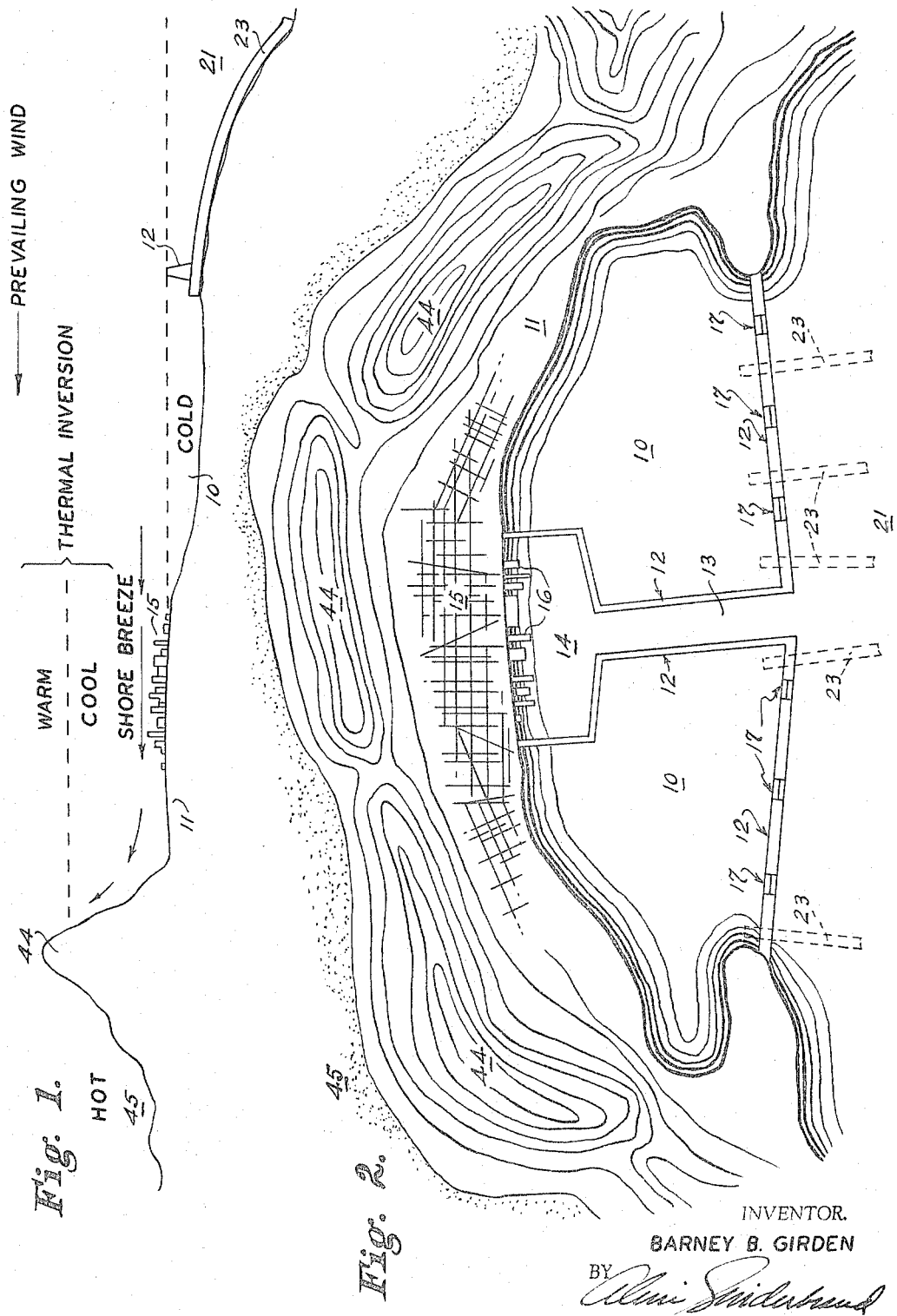

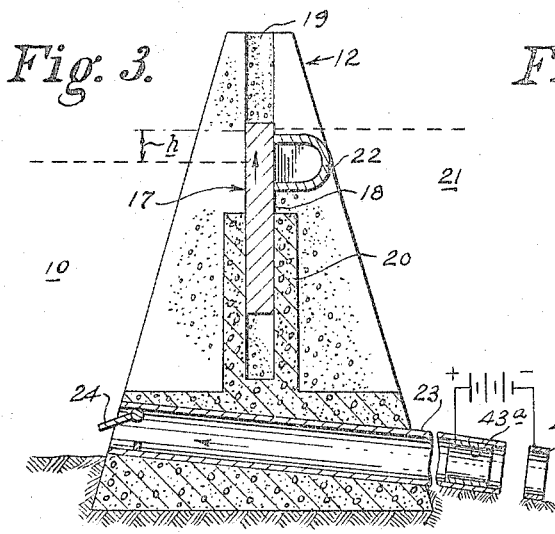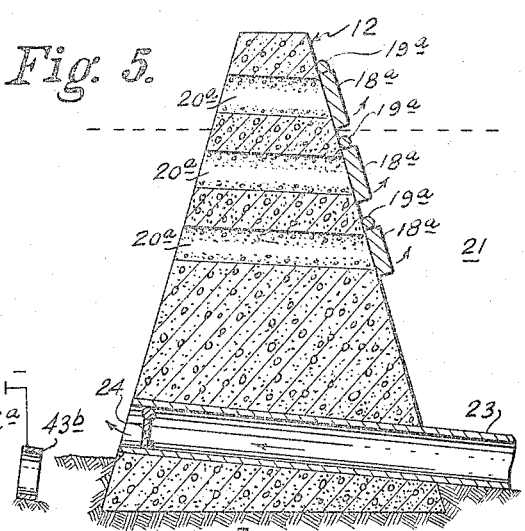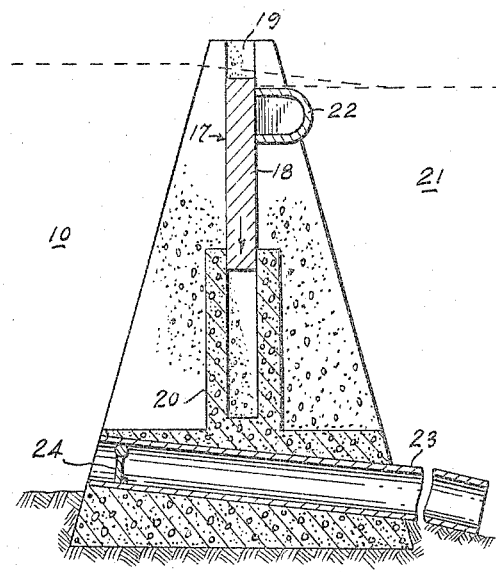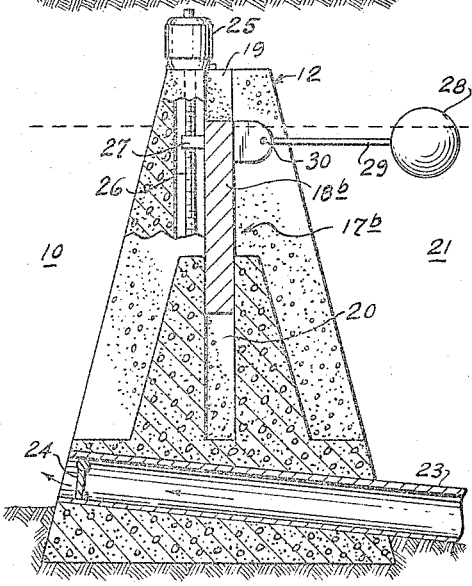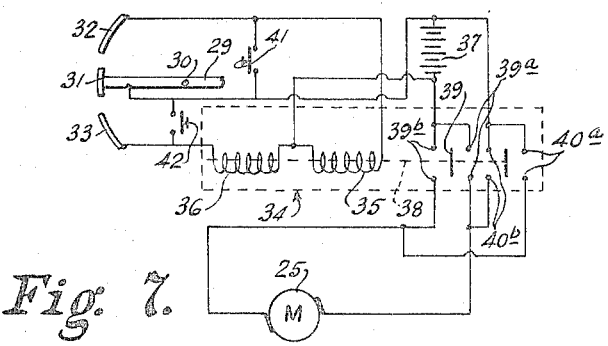
INVENTOR.
BARNEY B. GIRDEN

3,289,417
APPARATUS FOR EXCHANGING COASTAL
TIDAL WATERS WITH FRESH SEA WATER
Barney B. Girden, 32 W. 76th St., New York, N.Y.
Filed Jan. 24, 1962, Ser. No. 168,463
4 Claims. (Cl. 61—1)

This invention relates generally to apparatus and a method for exchanging tidal waters adjacent a land mass with fresh sea water.

It is an object of this invention to provide an apparatus and method by which the rise and fall of tides are employed for exchanging tidal waters adjacent a land mass with fresh sea water, thereby to provide means by which climatic conditions of coastal urban areas may be controlled for eliminating smog or fog, or to provide means by which ordinarily polluted tidal basins may be cleansed and restocked with fish from the adjacent sea or ocean, or further to provide means by which harbors may be kept ice-free in frigid climates.

In accordance with an important aspect of this invention, a body of tidal water is enclosed by a dam or breakwater structure having one or more gates therein automatically operated in response to the rising and falling of the tides so that, during a falling tide, water from the top of the enclosed body of water progressively drains through or over each gate into the adjacent sea or ocean and, during a rising tide, the upward movement of the level of the water within the enclosed body of water lags behind the upward movement of the level of water in the adjacent sea or ocean, thereby to provide a head of water which produces a flow of fresh sea water through one or more conduits opening from a suitable location in the adjacent sea or ocean into the enclosed body of tidal water.

Where the purpose of the foregoing arrangement is to prevent or eliminate pollution of a tidal basin, the conduit or conduits opening into the enclosed body of water merely extend from locations in the adjacent sea or ocean which are free of the undesirable pollutants so as to carry fresh or clean sea water into the tidal basin during each change of the tides. In connection with the elimination of pollution of a tidal basin, it may be also desirable, in accordance with the present invention, to provide the conduit or conduits carrying fresh sea water into the enclosed tidal basin with means for establishing electric lines of force which direct fish from the adjacent sea or ocean and cooperate with the flow of sea water through the conduit or conduits to induce the fish to enter the enclosed and cleansed tidal basin.

Where the objective is to keep a harbor ice-free in a frigid climate, the conduit or conduits opening into the enclosed harbor or body of water extend from a location at a sufficient depth in the adjacent sea or ocean where the temperature of the water is substantially constant and, in any case, substantially higher than the frigid air temperatures, so that the relatively warm water thus introduced into the enclosed harbor during each rise of the tide and the removal of the coldest surface water from the enclosed harbor during each fall of the tide will cooperate to keep the harbor in a substantially ice-free condition.

Where the condition to be corrected in accordance with the present invention is the accumulation of smog over a coastal urban area, the enclosed body of tidal water adjacent the urban area is supplied with relatively cold sea water during each rise of the tide, while the warmed surface water is removed from the enclosed body of tidal water during each fall of the tide so that the temperature of the enclosed body of water is thereby reduced to create conditions causing a suitably strong shore breeze. Such shore breeze is effective eventually to disrupt the thermal inversion that is usually responsible for the serious accumulation of smog over urban areas.

Where fog results from the contact of warm moist air with relatively cold ocean waters, such fog can be dissipated, in accordance with the present invention, by extending the conduit or conduits which open into the enclosed body of tidal water from a location in the adjacent sea or ocean having relatively warmer currents of water, thereby to raise the temperature of the enclosed tidal water.

The above, and other objects, features and advantages of the invention, will be apparent in the following detailed description of illustrative embodiments thereof which is to be read in connection with the accompanying drawings forming a part hereof, and wherein:

FIG. 1 is a diagrammatic elevational view illustrating the use of the present invention in eliminating the accumulation of smog over urban areas;

FIG. 2 is a diagrammatic plan view of the arrangement shown in FIG. 1;

FIG. 3 is an enlarged vertical sectional view of a gate structure that is included in the arrangement of FIGS. 1 and 2 in accordance with one embodiment of the present invention, and which is shown in its condition during a rising tide;

FIG. 4 is a view similar to that of FIG. 3, but showing the condition of the gate structure during a falling tide;

FIG. 5 is another view similar to that of FIG. 3, but showing a gate structure in accordance with another embodiment of the present invention;

FIG. 6 is another view similar to that of FIG. 3, but showing a gate structure in accordance with still another embodiment of the present invention; and FIG. 7 is a wiring diagram of electrical controls employed with the embodiment of FIG. 6.

Referring to the drawings in detail, and initially to FIGS. 1 and 2 thereof, it will be seen that, in accordance with the present invention, a body 10 of coastal tidal water adjacent a land mass 11 is enclosed by a dam, breakwater or other similar barrier which is generally indicated at 12. The length and construction of the dam or breakwater 12 is obviously dictated by the configuration of the shore line. Thus, where the body of tidal water to be enclosed is a wide or open bay, as in FIG. 2, then the dam or breakwater 12 is of relatively great length and may be constructed in two parts defining a channel 13 therebetween through which free access is provided to a protected harbor 14 adjacent an urban area 15 having docking facilities 16 at its shore line. On the other hand, if the tidal water to be enclosed is in the form of a natural harbor opening into the adjacent sea or ocean 21 through a narrow neck, then a relatively short dam or breakwater across the narrow neck is all that is required, and ships can enter and leave the harbor through suitable gates or locks provided in the dam or breakwater.

The dam or breakwater 12 is further provided with water control gates indicated generally at 17 and hereinafter described in detail. As shown in FIG. 3, a water control gate structure 17 suitable for use in connection with the present invention includes a vertically movable gate element 18 slidable in suitable guides 19 provided along the opposite sides of an opening in the dam or breakwater 12 and being retractable downwardly into an upwardly opening sleeve structure 20 provided at the bottom of the dam.

The vertical movements of the gate element 18 are controlled in response to the rising and falling tides of the open sea or ocean 21 at the outer side of the dam 12 so that the upper edge of gate element 18 is always slightly above the surface or level of the ocean or sea 21.

In the embodiment of the invention illustrated in FIGS. 3 and 4, the vertical movements of the gate element 18 are effected by a float or buoy 22 secured to the gate element at the outer side of the latter, that is, at the side facing the open ocean or sea 21. The float or buoy 22 is dimensioned to provide sufficient buoyancy for maintaining the top edge of gate element 18 the desired small distance above the upper surface of the water in which the float or buoy 22 is immersed.

Further, in accordance with the invention, one or more conduits 23 extend through the base of dam 12 and open into the enclosed body 10 of water. Each conduit 23 is provided with a check valve 24 (FIGS. 3 and 4) which opens only in the inward direction, that is, in the direction toward the enclosed body of water 10, so that water can flow through each conduit 23 only in the direction from the open sea or ocean 21 into the enclosed body 10 of water.

It will be apparent that, during a rising tide, gate element 18 moves upwardly with the level of the water in the ocean or sea 21 so that water from the latter cannot enter the enclosed body 10 of water over the gate element 18. Thus, each increase in the level of water at the outer side of gate element 18 creates a head $h$ (FIG. 3) which is effective to pump water through the conduit or conduits 23 from the ocean or sea 21 into the enclosed body 10 of water in back of dam or breakwater 12. On the other hand, as illustrated in FIG. 4, during a falling tide, gate element 18 moves downwardly with the falling tide of the sea or ocean 21 while the outward flow of water through each conduit 23 is prevented by the associated check valve 24. Thus, the surface water of the enclosed body of water 10 spills over the top edge of the downwardly moving gate element 18 during a falling tide.

Referring now to FIG. 5, it will be seen that, in accordance with another embodiment of the invention, each of the water control gate structures 17a in the dam 12 may be in the form of a vertically arranged series of gtaes 18a which are pivotally mounted, as at 19a, on an inclined outer surface of the dam 12 so that gravity urges the gate elements 18a downwardly to lie against the inclined outer surface of dam 12. Passages 20a extend substantially horizontally through dam 12 at the levels of the pivoted gate elements 18a and are closed, at their outer ends, by such gate elements. During a rising tide of the sea or ocean 21, the pressure of the water in the sea or ocean cooperates with the forces due to gravity in urging the gate elements 18a to their illustrated closed positions, so that water can enter the enclosed body 10 of water only through the conduits 23. However, during a falling tide, the level of the water in the ocean or sea 21 recedes before the level of the water in the enclosed body 10 so that a head of water acts successively through the passages 20a to open the related pivotally mounted gate elements 18a and thereby permit bleeding off of surface water from the body 10 into the sea or ocean 21 while flow of water into the sea or ocean through each conduit 23 is prevented by the associated check valve 24.

Referring now to FIG. 6, it will be seen that, in accordance with another embodiment of this invention, each water control gate structure 17b in the dam or breakwater 12 includes a vertical gate element 18b slidable in guides 19 at the opposite sides of an opening in the dam and being retractable downwardly into a sleeve 20 formed at the bottom of the dam opening. In the gate structure 17b of FIG. 6, the vertical movements of gate element 18b are effected by a reversible electric motor 25 driving a control screw 26 which extends vertically and is threadably engaged by a nut member 27 suitably secured to the gate element 18b. Thus, gate element 18b is raised and lowered by rotation of the shaft of motor 25 in opposite directions. In accordance with the present invention, the operation of motor 25 is normally controlled by the vertical movements or tides of the water at the outer side of gate element 18b, that is, in the ocean or sea 21. As illustrated in FIGS. 6 and 7, such control of motor 25 can be effected by a float 28 carried by an arm 29 which is pivotally mounted, as at 30, on gate element 18b so that arm 29 is angularly displaced or rocked relative to the gate element in response to rising and falling tides in the ocean or sea 21. The inner end of arm 29 carries a movable contact 31 (FIG. 7) which is disposed between two arcuate fixed contacts 32 and 33 when arm 29 extends horizontally in response to a steady level of water in the sea or ocean 21. It will be apparent that, during a falling tide, arm 29 rocks downwardly to engage movable contact 31 with fixed arcuate contact 32, whereas, during a rising tide, arm 29 is rocked upwardly to engage contact 31 with fixed arcuate contact 33.

In accordance with the present invention, the energizing circuit for motor 25 is arranged to cause rotation of the latter in the direction for lowering gate element 18b in response to engagement of contacts 31 and 32, and to rotate motor 25 in the direction for raising gate element 18b in response to engagement of contacts 31 and 33.

As shown particularly in FIG. 7, a suitable circuit for thus energizing motor 25 may include a polarized relay generally identified by the reference numeral 34 and having two coils 35 and 36 respectively connected to fixed contacts 32 and 33 and to one side of a source 37 of electric current, while the opposite side of source 37 is connected to the movable contact 31. Thus, coils 35 and 36 are selectively energized in response to the engagement of movable contact 31 with the fixed contact 32 or the fixed contact 33, respectively. The coils 35 and 36 are arranged so that, upon the selective energization thereof, as indicated above, the armature 38 of relay 34 is moved in opposite directions from the denergized position shown in FIG. 7, thereby to engage the movable relay contacts 39 and 40 either with the fixed contacts 39a and 40a or with the fixed contacts 39b and 40b. The connections between motor 25 and the source 37 through the contacts of relay 34 are arranged so that, upon closing of the relay contacts by energizing of coil 35, motor 25 turns in the direction for lowering gate element 18b and, conversely, upon closing of the relay contacts by energizing of relay coil 36, motor 25 is rotated in the direction for raising gate element 18b.

The gate structure 17b of FIGS. 6 and 7 functions in the same way as the gate structure 17 which has been described in detail with reference to FIGS. 3 and 4 so as to normally maintain the upper edge of gate element 18b a small distance above the level of the water in the ocean or sea 21.

The gate structure 17b has the additional advantage that normally open, manually actuable push-button switches 41 and 42 may be connected between the conductors leading to the movable contact 31 and to the fixed contacts 32 and 33, respectively. Thus, even when the gate element 18b is not being vertically displaced in response to a rising or falling tide, the motor 25 can be operated to lower the gate element under the manual control of switch 41, thereby to permit a ship or boat to pass through the gate structure, or to render the gate structure inoperative as a water control device and thereby permit the tidal waters to pass between the sea or ocean 21 and the enclosed body 10 without the normal influence of the gate structure.

Since water from the ocean or sea 21 normally is allowed to enter the enclosed body 10 of water only through the conduits 23, this aspect of the operation of the structure provided in accordance with each of the above described embodiments of the invention makes it possible to replenish the supply of ocean fish in the enclosed body 10 of water through the conduits 23. Ocean fish may be further encouraged to enter the conduits 23, where they are then drawn along by the relatively fast flow of water, by providing positive and negative electrodes 43a and 43b (FIG. 3) respectively disposed within and adjacent the outer end of each conduit 23 establishing electric lines of force therebetween which, as has been previously discovered, direct fish into the conduit. Although the electrodes 43a and 43b establishing electric lines of force for directing or leading the fish are only shown associated with the embodiment of the invention illustrated in FIGS.

3 and 4, it is to be understood that similar arrangements may be provided in connection with the embodiments of FIG. 5 and FIGS. 6 and 7, respectively.

The use of the previously described dam or breakwater 12 enclosing a body 10 of coastal tidal water and having the water control gate structures 17, 17a or 17b interposed therein will now be described with reference to FIGS. 1 and 2 in connection with the elimination of smog over an urban area. It is well known that automobiles, industrial plants, and residential structures discharge large quantities of carbon monoxide, organic vapors, that is, hydrocarbons, and nitrous oxides, plus smaller amounts of sulphur and other chemicals, into the atmosphere in the regions of heavily populated urban areas. The strong breezes that attend the movement of great air masses over the continents normally bring fresh air into most cities or other heavily populated urban areas and, even in the absence of such breezes, the air of such urban areas is normally cleansed by updrafts that dilute and carry away both the smoke and vaporized chemicals. Such updrafts result from the fact that the air adjacent the ground is warmed by the latter to a temperature substantially above that of the air at a substantial elevation above the ground so that normal convection currents cause the air to rise from the ground carrying along with it the above mentioned pollutants discharged into the atmosphere.

However, the above mentioned natural ventilation processes frequently fail so that there may be no movement of air over a particular heavily populated urban area for a matter of hours and sometimes days. One mechanism that stops air movement is the "thermal inversion" which disturbs or alters the normal temperature gradient. In thermal inversion, a layer of relatively warmer air forms at a higher altitude and traps a layer of relatively colder air at the ground.

As shown in FIGS. 1 and 2, frequent thermal inversion may occur, as in the area of the city of Los Angeles, when the coastal region occupied by the urban area 15 is closed in by mountain ranges 44 which are, in turn, backed up by a hot land mass, for example, a desert 45 or the like. Under these conditions, hot air warmed by the desert 45 can pass over the mountain ranges 44 and create a layer of warm air trapping a relatively cooler layer of air in the bowl-like cavity defined by the mountain ranges 44 enclosing the city or urban area 15. When such a thermal inversion roofs over the atmosphere of a heavily populated urban area, the trapped layer of relatively cooler air accumulates progressively increasing concentrations of pollutants. In the Los Angeles area, such thermal inversions occur about one hundred days each year and produce smog which is conceded to be severely injurious to the health of the inhabitants, as well as being a transportation hazard.

In accordance with the present invention smog resulting from the foregoing causes is eliminated by providing a body or bodies 10 of cold water off the shore of the land mass 11 so that the contrast between the low temperature of the enclosed body or bodies 10 of cold water and the relatively higher temperature of the land mass 11 will create substantial shore breezes, as illustrated in FIG. 1 which will flow over the highly populated urban area 15 under the pollutant containing trapped air layer and be driven upwardly by the surrounding mountain ranges 44, thereby to gradually lift the stagnant pollutant containing layer of cool air, which is nevertheless warmer than the air of the incoming shore breeze, until the inversion belt, that is, the demarkation between the high altitude warm air and the stagnant layer of relatively cooler air, is raised above the top of the mountain ranges 44 to permit the prevailing high altitude winds to carry away the pollutants.

When the present invention is to be employed for eliminating smog, as described above, the conduits 23 opening into the enclosed body or bodies 10 of water extend into the sea or ocean 21 to locations containing cold water. Such locations can be easily located since the temperatures in the ocean decrease from 6° C. at 200 meters depth to 2° C. at 1200 meters depth, even at the equator. Further, daily temperature changes do not extend below 10 to 20 meters below the surface of the ocean, and annual changes cannot be detected below a depth of 200 meters. Particularly convenient access to cold water from substantial depths in the ocean can be obtained in the Los Angeles area by reason of the existence of the deep Point Dume, Santa Monica, Redondo, Point Fermin, Newport and Dana Point Canyons which are located relatively close to the shore.

When the conduits 23 extend to points in the sea or ocean 21 containing cold water, for example, at a temperature of about 5° C., it will be apparent that the body or bodies 10 of water enclosed by the dam or breakwater 12 and gate structures previously described as embodying the present invention, will be filled with extremely cold water during each rising tide, while each falling tide will remove the warmed surface water from the enclosed body or bodies 10 of water thereby continuing to expose relatively colder water at the surface of the body or bodies 10. Since a difference of only 5° C. between land and sea temperatures will produce very strong breezes, it is apparent that the enclosed body or bodies 10 of cold water, which may conveniently have a surface area of from 50 to 150 square miles, lying off shore from the land mass 11 of relatively higher temperature will produce the strong shore breezes required for cleansing the air over the heavily populated urban area 15 and thereby preventing the accumulation or development of smog.

Since the tidal control of the operation of the gates in the dam 12 may be overriden by manual control, as by the switches 41 and 42 in the embodiment of FIGS. 6 and 7, it will be apparent that the temperature of the water in the enclosed body or bodies 10 may be regulated to control the strength of the resulting shore breezes, and thereby provide a substantial measure of climate control for the adjacent urban area 15.

The dam or breakwater 12 further serves to provide a well protected harbor for pleasure boats, and may be sufficiently wide to accommodate a roadway or recreational facilities.

If the enclosed body 10 of water is constituted by a polluted harbor or bay, the structures previously described herein as embodying the invention may be employed for cleansing such polluted waters and, in that case, the conduits 23 need only extend out into the adjacent ocean or sea 21 to a region containing fresh sea water. With such an arrangement, the polluted waters will be removed from the enclosed harbor or bay during each falling tide and clean sea water will be positively pumped through the conduits 23 into the enclosed harbor or bay during each rising tide. The use of the present invention in avoiding pollution of harbors and bays will be particularly advisable in the case of such bodies of water opening into an ocean or sea through a relatively narrow neck in which case, the normal tidal movements tend to return polluted water into the harbor or bay during each rising tide, whereas, the conduits 23 included in the structures embodying the present invention may be extended sufficiently far out into the sea or ocean so as to ensure the refilling of the harbor or bay with clean sea water.

Since annual changes in water temperatures in the ocean cannot be detected below 200 meters, the previously described structural arrangements embodying this invention may be employed for maintaining harbors substantially free of ice even in frigid climates. When employing the present invention for the foregoing purpose, the conduits 23 are extended out into the ocean or sea so as to gain access to water from the depths which is relatively warm, that is, above the temperature of the frozen surface waters. Since relatively warmer water is pumped into the enclosed body or bodies 10 of water during each rising tide, and the coldest surface waters are removed from the enclosed body 10 of water during each falling tide, the temperature of the water in the enclosed body 10 can be maintained above the freezing temperature, thereby to prevent the substantial formation of ice even though the air temperatures are considerably below the freezing point.

Such pumping of relatively warm water into the enclosed body of water may also be effective to prevent the formation of fogs that result when relatively warm and moist air comes into contact with bodies of cold water adjacent sea coast urban areas. For example, in the region of San Francisco, which is notorious for its dense fogs, San Francisco Bay could be enclosed in accordance with the present invention and the conduits 23 extended out into the Pacific Ocean to regions or currents containing relatively warm water, thereby to elevate the temperature of San Francisco Bay and inhibit the formation of fogs.

Although illustrative embodiments of the present invention have been described in detail herein with reference to the accompanying drawings, it is to be understood that the invention is not limited to those precise embodiments, and that various changes and modifications may be effected therein by one skilled in the art without departing from the scope or spirit of the invention, except as defined in the appended claims.

What is claimed is:
1. Apparatus for exchanging coastal tidal water with fresh sea water comprising:
  (a) means enclosing an existing body of coastal tidal water;
  (b) gate means interposed in said enclosing means and including a vertically movable gate element, and means responsive to the level of water in said adjacent sea to move said gate element vertically with the rising and falling tides of said adjacent sea so that the top edge of said gate element is maintained above the level of the water in said adjacent sea, whereby said gate means is operative to permit the flow of water therethrough from the top of the enclosed body of water into the adjacent sea only during a falling tide of the latter; and
  (c) conduit means opening from said adjacent sea into said enclosed body of coastal tidal water and having check valve means interposed therein to permit flow therethrough only in the direction into said enclosed body of coastal tidal water, thereby to conduct fresh sea water into said enclosed body from said adjacent sea under the pressure of a rising tide of said sea.

2. Apparatus as in claim 1; wherein said means responsive to the level of water in said adjacent sea to move said gate element includes a buoyant member secured to said gate element at the side of the latter facing said adjacent sea.

3. Apparatus as in claim 1; wherein said means responsive to the level of water in said adjacent sea to move said gate element includes
  (1) reversible motor operated means for raising and lowering said gate element, and
  (2) control means for said motor operated means having a buoyant member movably mounted at the side of said gate element facing said adjacent sea for immersion in the latter, said control means causing said motor operated means to raise and lower said gate element in response to upward and downward movements, respectively, of said buoyant member relative to said gate element.

4. Apparatus as in claim 3; wherein said control means further includes manually actuable control elements to cause said motor operated means to selectively raise and lower said gate element independently of any movement of said buoyant member relative to said gate element.

References Cited by the Examiner

UNITED STATES PATENTS

| | | | |
|---|---|---|---|
| 189,643 | 4/1877 | Newhouse | 61—20 |
| 299,559 | 6/1884 | Loretz | 61—2 |
| 439,517 | 10/1890 | Ivey et al. | 61—28 |
| 1,255,159 | 2/1918 | Gustafson | 61—20 |
| 2,041,576 | 5/1936 | Suksdorf | 61—28 |
| 2,778,140 | 1/1957 | Applegate et al. | 119—3 X |

FOREIGN PATENTS

| | | |
|---|---|---|
| 598,774 | 5/1960 | Canada. |
| 2,428 | 1886 | Great Britain. |

EARL J. WITMER, *Primary Examiner.*

BENJAMIN BENDETT, *Examiner.*